United States Patent
Liu et al.

(10) Patent No.: US 8,665,230 B2
(45) Date of Patent: Mar. 4, 2014

(54) SENSING DISPLAY DEVICE

(75) Inventors: Po-Yuan Liu, Hsinchu (TW); Yi-Long Wang, Taipei (TW); Chun-Ku Kuo, Taoyuan County (TW); Ming-Lun Hsieh, Taoyuan County (TW); Hung-Wen Chou, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 560 days.

(21) Appl. No.: 12/907,030

(22) Filed: Oct. 19, 2010

(65) Prior Publication Data

US 2011/0310033 A1 Dec. 22, 2011

(30) Foreign Application Priority Data

Jun. 17, 2010 (TW) .............................. 99119673 A

(51) Int. Cl.
*G06F 3/041* (2006.01)
(52) U.S. Cl.
USPC ........................................... 345/173; 345/174
(58) Field of Classification Search
None
See application file for complete search history.

(56) References Cited

U.S. PATENT DOCUMENTS

| | | | |
|---|---|---|---|
| 5,559,504 A | 9/1996 | Itsumi et al. | |
| 7,733,332 B2 * | 6/2010 | Steenwyk et al. | 345/173 |
| 8,248,328 B1 * | 8/2012 | Wedding et al. | 345/63 |
| 2006/0028485 A1 * | 2/2006 | Yoshida et al. | 345/600 |
| 2009/0027371 A1 * | 1/2009 | Lin et al. | 345/207 |
| 2009/0194344 A1 | 8/2009 | Harley et al. | |
| 2010/0214247 A1 * | 8/2010 | Tang et al. | 345/173 |
| 2010/0283757 A1 * | 11/2010 | Wu et al. | 345/174 |
| 2011/0102361 A1 * | 5/2011 | Philipp | 345/174 |
| 2011/0147973 A1 * | 6/2011 | Sung et al. | 264/40.5 |

FOREIGN PATENT DOCUMENTS

| | | |
|---|---|---|
| CN | 101477430 | 7/2009 |
| CN | 101515095 | 8/2009 |
| CN | 101719037 | 6/2010 |
| TW | I274273 | 2/2007 |
| TW | 200915161 | 4/2009 |

* cited by examiner

*Primary Examiner* — Bipin Shalwala
*Assistant Examiner* — Yaron Cohen
(74) *Attorney, Agent, or Firm* — Jianq Chyun IP Office

(57) ABSTRACT

A sensing display device including a display panel and a sensing element is provided. The display panel includes at least a plurality of pixel units, and the pixel units are arranged along a primary direction. The sensing element is disposed on the pixel units and includes at least a plurality of sensor units. Each of the sensor units includes a mesh-pattern electrode, and the mesh-pattern electrode includes a plurality of first traces having conductivity. At least one of the first traces is substantially extended along a first direction, wherein a first angle is formed between the first direction and the primary direction, and the first angle is an acute angle.

15 Claims, 18 Drawing Sheets

SENSING DISPLAY DEVICE

CROSS-REFERENCE TO RELATED APPLICATION

This application claims the priority benefit of Taiwan application serial no. 99119673, filed on Jun. 17, 2010. The entirety of the above-mentioned patent application is hereby incorporated by reference herein and made a part of this specification.

BACKGROUND

1. Field of the Invention

The invention relates to a display device. More particularly, the invention relates to a sensing display device.

2. Description of Related Art

In this information society, people increasingly depend on electronic products. The electronic products such as all-in-one personal computers (AIO PCs), tablet personal computers (tablet PCs), personal digital assistants (PDAs) or smart phones are widely used in daily life. In order to achieve purposes of convenience, compact size and humanity, conventional input devices of many information products such as keyboards and mice have been replaced by touch panels, and a sensing display device or a touch-screen simultaneously having a touch control function and a display function becomes one of most popular product.

Generally, the sensing display device includes a display panel and a sensing element, wherein the sensing element can be built in the display panel or externally attached to the display panel. The sensing element generally includes a plurality of sensor unit with fixed coordinate positions, wherein each of the sensor units has one or a plurality of electrodes. When a user approaches or touches the sensor unit with his or her finger, capacitance between the electrodes is changed, and a signal indicating such a change is transmitted to a controller, so as to calculate the coordinate of the touched location. Thereby, a display image on the display panel can be changed according to the user's operation.

In the conventional sensing display device or touch-screen, to ensure transmittance of the sensing element, a transparent conductive material can be used to fabricate the electrodes. However, since the transparent conductive material has drawbacks of high resistance and high price, metal mesh is suggested to be used for fabricating the electrodes. Since the metal mesh is composed of grids formed by extremely fine metal wires, the mesh-pattern electrode not only maintains and increases the transmittance, but also has relatively small resistance, so that a better sensitivity is achieved.

However, since the mesh-pattern of the electrodes and a pixel array in the display panel are both arranged periodically, the mesh-pattern electrodes and the pixel array may cause the display a visual Moiré issue. Therefore, the sensing display device may have problems of image blur and poor visual quality.

SUMMARY

The invention is directed to a sensing display device, which maintains a good sensitivity and has a good visual quality.

The invention provides a sensing display device including a display panel and a sensing element. The display panel includes at least a plurality of pixel units, and the pixel units are arranged along a primary direction. The sensing element is disposed on the pixel units and includes at least a plurality of sensor units. The sensor unit is a mesh-pattern electrode, and the mesh-pattern electrode includes a plurality of first traces having conductivity. At least one of the first traces is substantially extended along a first direction, wherein a first angle is formed between the first direction and the primary direction, and the first angle is an acute angle.

According to the above descriptions, the sensing element of the sensing display device of the invention includes mesh-pattern electrodes formed by intersected traces, wherein an acute angle is formed between the traces and a direction along which the pixel units are arranged. In this way, a visual Moiré issue caused by the mesh-pattern electrodes formed by the intersected traces and the pixel units arranged in an array can be avoided, so that a visual quality and a display quality of the sensing display device are improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
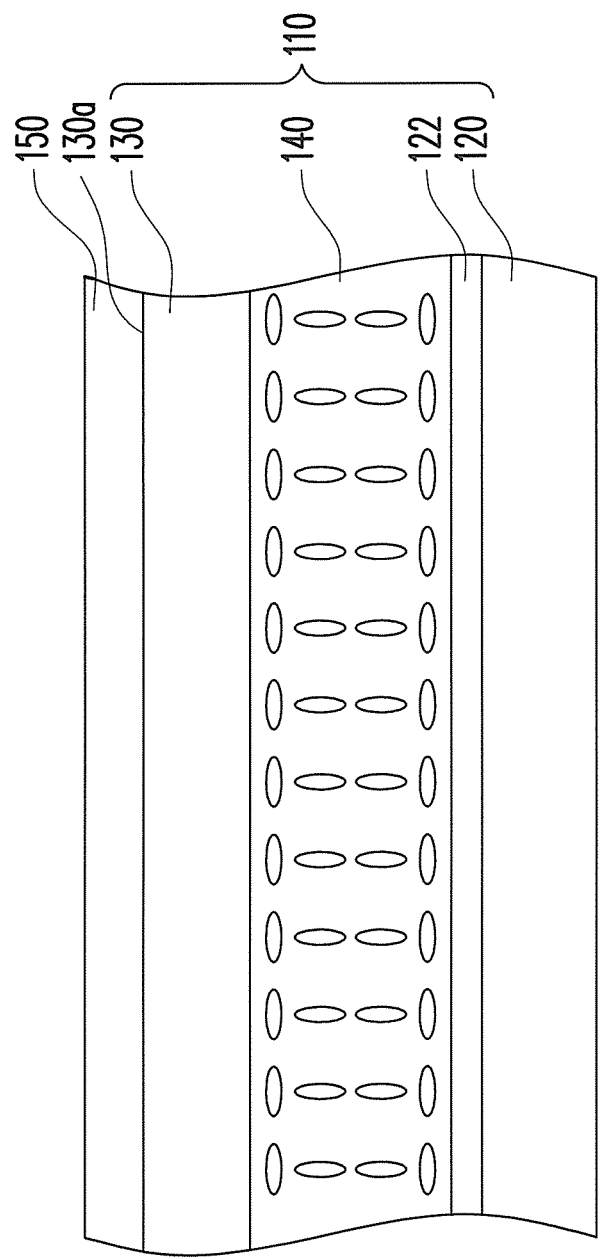
FIG. 1A is a cross-sectional view of a sensing display device according to a first embodiment of the invention.
Figure 1B:
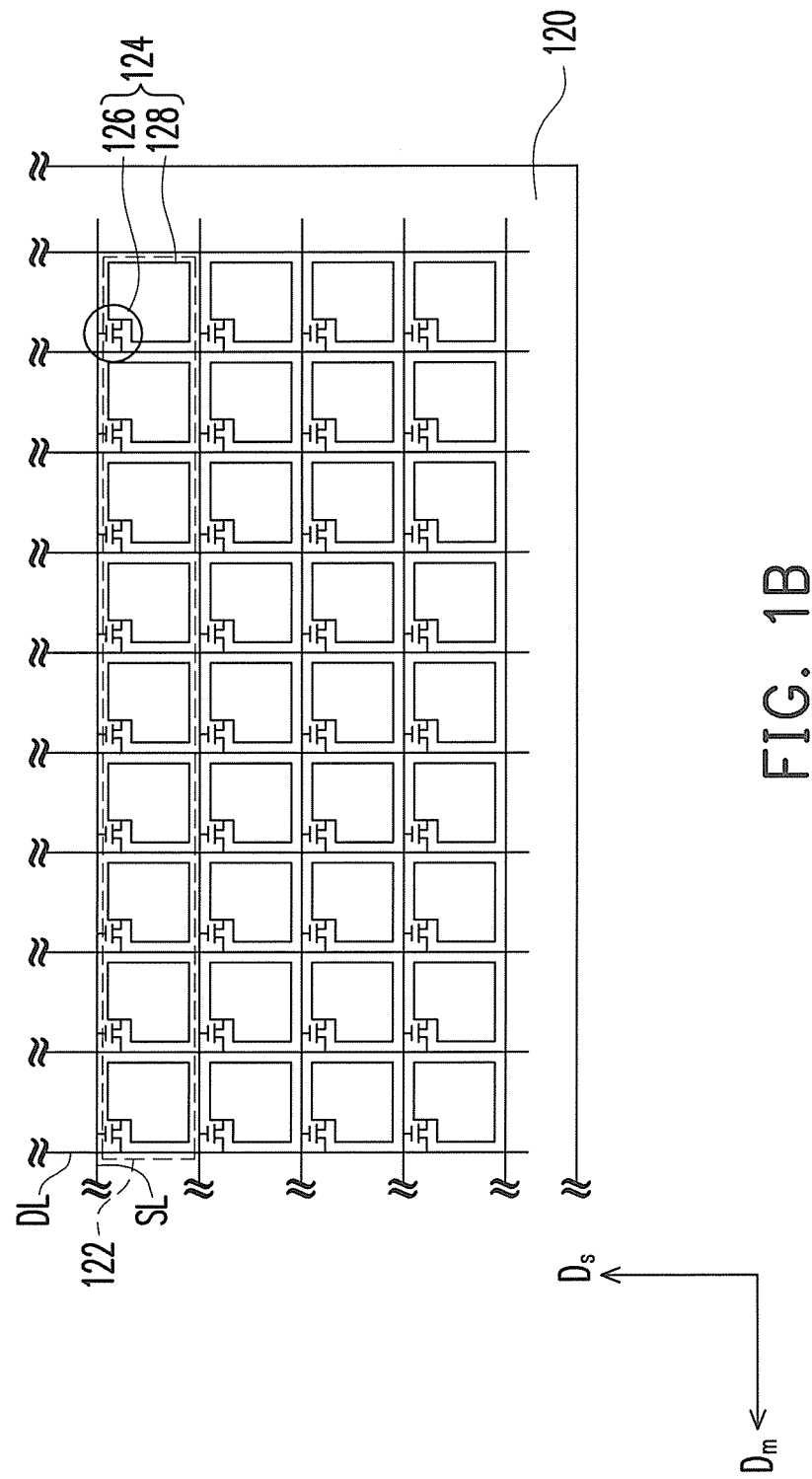
FIG. 1B is a top view of a pixel array of FIG. 1A.
Figure 1C:
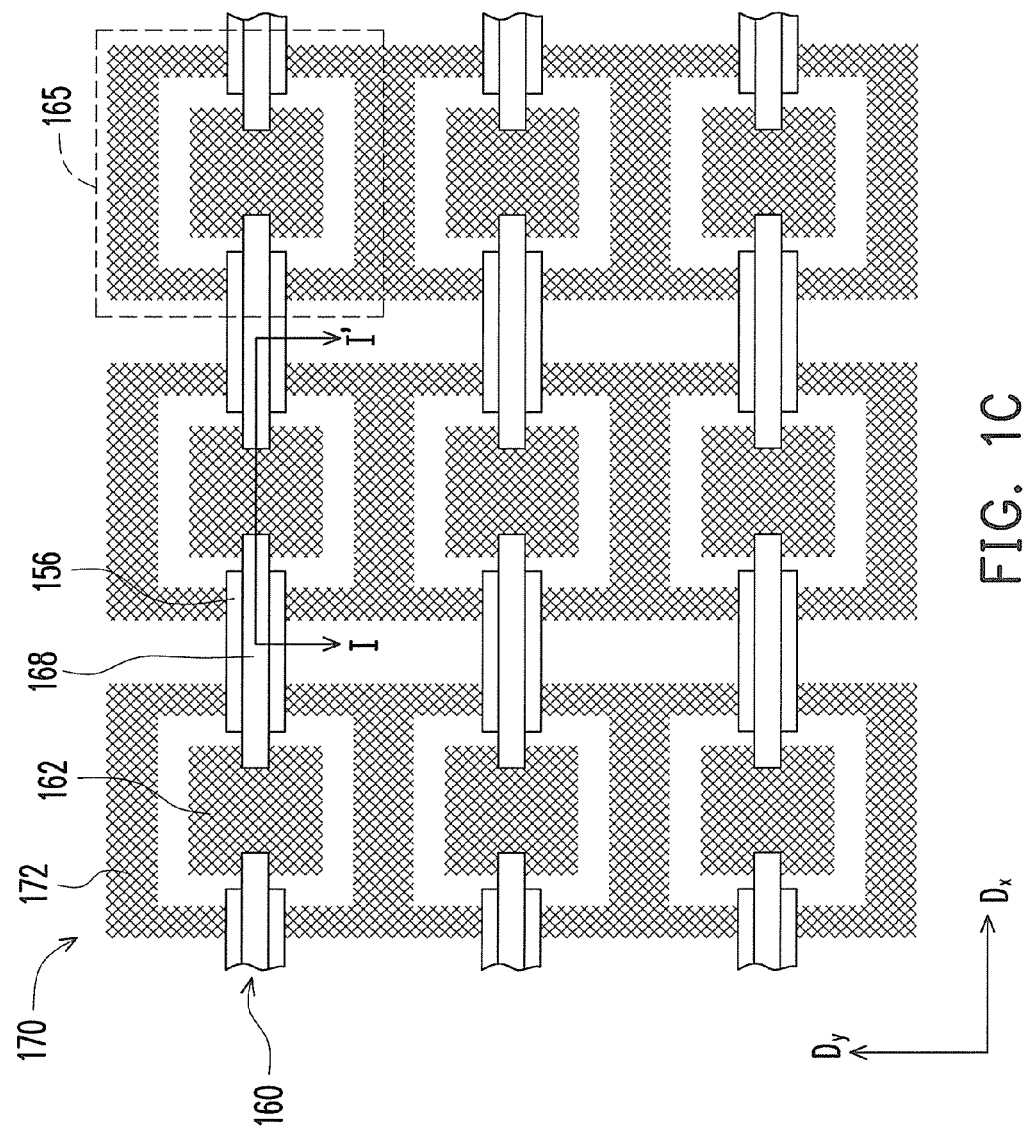
FIG. 1C is a top view of a sensing element of FIG. 1A.
Figure 1D:
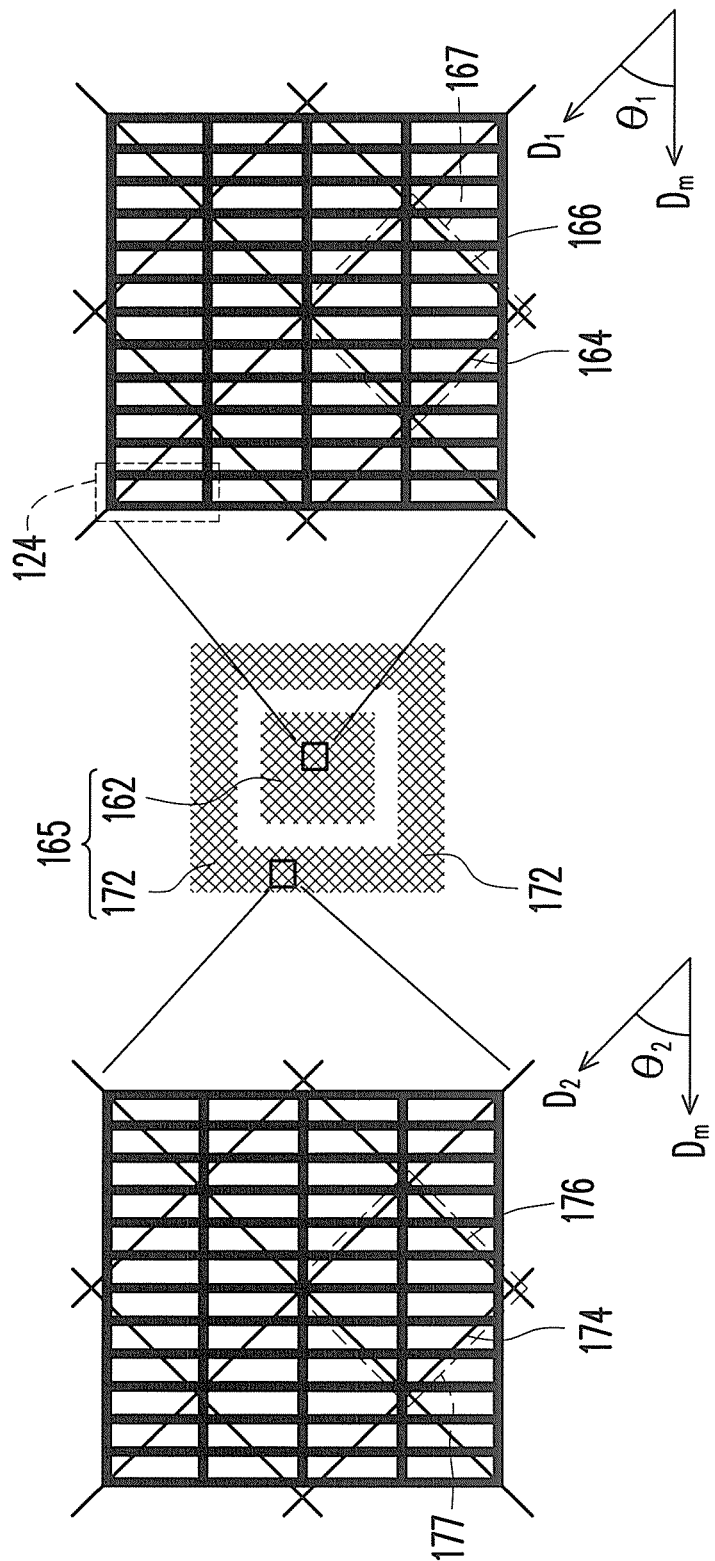
FIG. 1D is a partial schematic diagram illustrating a configuration showing the relationship of a first electrode, a second electrode of FIG. 1C and pixel units.
Figure 1E:
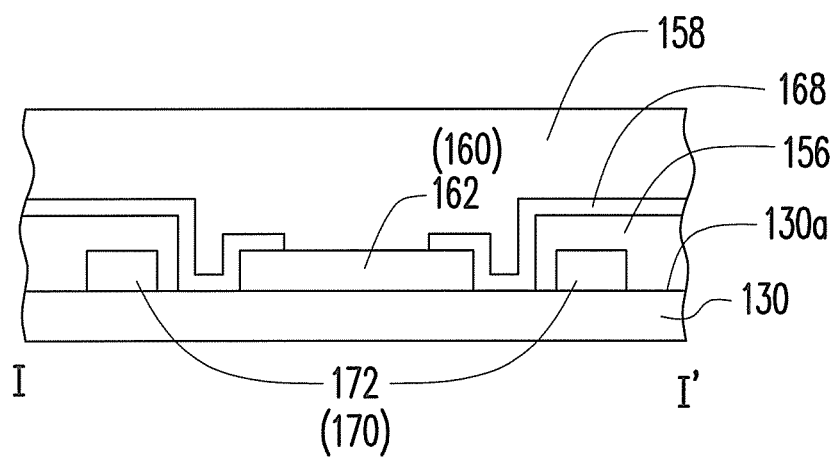
FIG. 1E is a cross-sectional view of FIG. 1C along I-I' line.

FIG. 1A is a cross-sectional view of a sensing display device according to a first embodiment of the invention, FIG. 1B is a top view of a pixel array of FIG. 1A, FIG. 1C is a top view of a sensing element of FIG. 1A, FIG. 1D is a partial schematic diagram illustrating a configuration showing the relationship of a first electrode, a second electrode of FIG. 1C and pixel units, and FIG. 1E is a cross-sectional view of FIG. 1C along an I-I' line. Referring to FIG. 1A and FIG. 1B, the sensing display device 100 includes a display panel 110 and a sensing element 150. The display panel 110 includes an active device array substrate 120, a plurality of pixel rows 122, an opposite substrate 130 and a display medium layer 140, wherein the display medium layer 140 is located between the active device array substrate 120 and the opposite substrate 130. The pixel rows 122 are, for example, disposed on the active device array substrate 120, and a plurality of the pixel rows 122 forms a pixel array, wherein each pixel row 122 includes a plurality of pixel units 124 arranged along a primary direction $D_m$.

In the present embodiment, the pixel units 124 in the different pixel rows 122 are, for example, aligned along a secondary direction $D_s$, i.e. the pixel units 124 are arranged on the active device array substrate 120 in an array along the primary direction $D_m$ and the secondary direction $D_s$. The primary direction $D_m$ is, for example, a row direction, and the secondary direction $D_s$ is, for example, a column direction, and the primary direction $D_m$ is, for example, perpendicular to the secondary direction D. In other embodiments, the pixel units 124 in the different pixel rows 122 are not aligned along the secondary direction $D_s$. The pixel units 124 in the different pixel rows 122 may be arranged in an interlace manner, for example. For example, in an embodiment, the pixel units 124 in the odd pixel rows 122 are, for example, aligned along the secondary direction $D_s$, and the pixel units 124 in the even pixel rows 122 are, for example, aligned along the secondary direction $D_s$, though the pixel units 124 in the odd pixel rows 122 and the pixel units 124 in the even pixel rows 122 are not, for example, aligned along the secondary direction D. In other words, an arrangement of the pixel rows 122 is not limited, though the pixel units 124 are, for example, periodically arranged on the active device array substrate 120.

Referring to FIG. 1B, a plurality of scan lines SL and a plurality of data lines DL are disposed on the active device array substrate 120, wherein the scan lines SL are extended along a row direction, and the data lines DL are extended along a column direction. Each of the pixel units 124 may include an active device 126 and a pixel electrode 128 electrically connected to the active device 126. The active device 126 is, for example, a thin-film transistor, and each pixel unit 124 is electrically connected to a corresponding data line DL and a corresponding scan line SL through the active device 126.

Referring to FIG. 1A, in the present embodiment, the opposite substrate 130 is, for example, a color filter substrate. The display medium layer 140 is, for example, a liquid crystal material. In other words, the sensing display device 100 of the present embodiment is, for example, a touch liquid crystal display (LCD) panel. The display medium layer 140 can also be other suitable display materials, for example, an organic light emitting material, an electrophoretic display material, or a plasma display material. Therefore, the sensing display device 100 can also be a touch organic light emitting display panel, a touch electrophoretic display panel, or a touch plasma display panel. The display materials and panel structures are known by those skilled in the art, and therefore detailed descriptions thereof are not repeated.

Referring to FIG. 1A to FIG. 1C, the sensing element 150 is disposed on an array of the pixel units 124, and the sensing element 150 includes a plurality of sensor units 165. The sensor unit 165 is a mesh-pattern electrode. In the present embodiment, the sensor unit 165 includes a first electrode 162 and a second electrode 172. In detail, in the present embodiment, the sensing element 150 includes a plurality of sensor units 165, which are arranged in a plurality of first serials 160 and a plurality of second serials 170, and the sensing element 150 is, for example, disposed on an outer surface 130a of the opposite substrate 130. The first serial 160 is extended along a first axial direction $D_x$, and the first serial 160 includes a plurality of first electrodes 160 and a plurality of bridge lines 168 connected to the first electrodes 162. The second serial 170 is extended along a second axial direction $D_y$, and the second serial 170 includes a plurality of second electrodes 172 electrically connected to each other. In the present embodiment, the first axial direction $D_x$ is, for example, parallel to the primary direction $D_m$, and the first axial direction $D_x$ is, for example, the row direction. The second axial direction $D_y$ is parallel to the secondary direction $D_s$, and the second axial direction $D_y$ is, for example, the column direction. The first serials 160 are electrically isolated, and the second serials 170 are electrically isolated.

FIG. 1D is a partial schematic diagram illustrating a configuration showing the relationship of a first electrode, a second electrode of FIG. 1C and a pixel unit array. It should be noticed that in FIG. 1D, to clearly illustrate the configuration showing the relationship of the first electrodes 162, the second electrodes 172 and the pixel units 124, a region depicted by a thick black line represents a boundary of one pixel unit 124 of FIG. 1B. In the present embodiment, the thick black lines may represent positions of the data lines and the scan lines, though in other embodiments, the thick black lines can also be a black matrix or only represent the boundaries of the pixel units, and do not represent the positions of the data lines and the scan lines. Referring to FIG. 1C and FIG. 1D, in the present embodiment, the first electrode 162 is, for example, an inner electrode, and the second electrode 172 is, for example, an outer electrode, and the first electrodes 162 are respectively encircled by the second electrodes 172 in a one-to-one approach. The first electrode 162 includes a plurality of first traces 164 and a plurality of second traces 166. The first traces 164 are substantially extended along a first direction D1, and a first angle θ1 is formed between the first direction D1 and the primary direction $D_m$, wherein the first angle θ1 is an acute angle. The second traces 166 are substantially intersected to the first traces 164. In other words, the first electrode 162 is a mesh-pattern electrode formed by a plurality of the first traces 164 and a plurality of the second traces 166, and the first electrode 162 includes a plurality of grids 167 formed by the intersected first traces 164 and second traces 166. The grids 167 are periodically arranged. In the present embodiment, the first angle θ1 is about 20-70 degrees, or about 30-60 degrees. The second traces 166 are, for example, not parallel to the primary direction $D_m$ or the secondary direction D. The second traces 166 are, for example, perpendicular to the first traces 164. It should be noticed that although a situation that all of the first traces 164 are extended along the first direction D1 is taken as an example, the first traces 164 may have different extending directions, though at least one of the first traces 164 is extended along the first direction D1.

In the present embodiment, the second electrode 172 may include a plurality of third traces 174 and a plurality of fourth traces 176. The third traces 174 are substantially extended along the second direction D2, and a second angle θ2 is formed between the second direction D2 and the primary direction $D_m$, wherein the second angle θ2 is an acute angle. The fourth traces 176 are substantially intersected to the third traces 174. In other words, the second electrode 172 is a mesh-pattern electrode formed by a plurality of the third traces 174 and a plurality of the fourth traces 176, and the second electrode 172 includes a plurality of grids 177 formed by the intersected third traces 174 and fourth traces 176. The grids 177 are periodically arranged. In the present embodiment, the third traces 174 and the fourth traces 176 are substantially straight lines. The second angle θ2 is about 20-70 degrees, or about 30-60 degrees. The fourth traces 176 are, for example, not parallel to the primary direction $D_m$ or the secondary direction D. The fourth traces 176 are, for example, perpendicular to the third traces 174. In the present embodiment, the second direction D2 is substantially parallel to the first direction D1, so that the third traces 174 are parallel to the first traces 164. Moreover, the fourth traces 176 are parallel to the second traces 166. In other words, in the present embodiment, the first electrode 162 and the second electrode 172 are substantially formed by two sets of traces having the same extending directions.

Referring to FIG. 1C and FIG. 1E, in the present embodiment, the first serials 160 and the second serials 170 are all disposed on the outer surface 130a of the opposite substrate 130. The sensing element 150 further includes a dielectric layer 156 and a passivation layer 158. The dielectric layer 156 is disposed between the first serial 160 and the second serial 170, so that the first serial 160 and the second serial 170 are mutually isolated. The passivation layer 158 covers the first serial 160 and the second serial 170. In the present embodiment, the bridge line 168 is connected to the first electrode 162. The bridge line 168 is, for example, a wire formed by a patterned conductive layer and does not have the mesh-pattern structure. A material of the bridge line 168 is, for example, transparent conductive metal oxide. However, in other embodiments, the bridge line 168 can also be a mesh-pattern wire formed by a plurality of the first traces 164 and a plurality of the second traces 166.

In the present embodiment, a material of the first traces 164, the second traces 166, the third traces 174 and the fourth traces 176 includes metal or transparent conductive metal oxide, wherein the metal is, for example, aluminium, copper, molybdenum, titanium, silver, gold, platinum and alloy thereof, and the transparent conductive metal oxide is, for example, an indium tin oxide (ITO), an indium zinc oxide (IZO) or other metal oxides. A line width of the first traces 164, the second traces 166, the third traces 174 and the fourth traces 176 is, for example, from 0.1 μm to 100 μm. In other words, the first electrode 162 and the second electrode 172 are substantially formed by extremely fine metal wires, so that the first electrode 162 and the second electrode 172 have a high transmittance. Moreover, in the present embodiment, although profiles of the first electrode 162 and the second electrodes 172 are rectangles. In other embodiments, the profiles of the first electrode 162 and the second electrodes 172 can also be diamonds, rounds or any other shapes. Moreover, parameters such as spaces between the adjacent traces 164, 166, 174 and 176, an intersection angle of the first traces 164 and the second traces 166, and an intersection angle of the third traces 174 and the fourth traces 176 can be adjusted according to an actual utilization requirement, which is not limited by the invention.

It should be noticed that in the present embodiment, although the first electrode 162 and the second electrode 172 are formed by two sets of traces having the same extending directions, in other embodiments, the third traces 174 are probably not parallel to the first traces 164, and the fourth traces 176 are probably not parallel to the second traces 166. In other words, the first electrode 162 and the second electrode 172 can also be formed by two sets of traces having different extending directions.

Moreover, in the present embodiment, the first electrode 162 and the second electrode 172 are formed by a plurality of intersected traces, though in other embodiments, one of the first electrode 162 and the second electrode 172 can be formed by a patterned conductive layer and does not have the mesh-pattern structure.

Referring to FIG. 1D, generally, when the electrodes 162 and 172 have a plurality of the grids 167 and 177 formed by the intersected traces 164, 174 and 166, 176, since the grids 167 and 177 of the electrodes 162 and 172 and the pixel units 124 in the display panel 110 are all structures arranged in periodicity, an array formed by the grids 167 and 177 of the electrodes 162 and 172 and an array of the pixel units 124 (i.e. pixel array) may have a visual Moiré issue, which may cause that the electrodes 162 and 172 formed by the traces 164, 166, 174 and 176 become visible structures. However, in the present embodiment, by forming the first angle θ1 between the first traces 164 of the first electrode 162 and an arranging direction (the primary direction $D_m$) of the pixel rows 122, the visual Moiré issue caused by the first electrode 162 and the array of the pixel units 124 (i.e. the pixel array) can be avoided, and the first electrode 162 may become an invisible structure. Similarly, by forming the second angle θ2 between the third traces 174 of the second electrode 172 and the arranging direction (the primary direction $D_m$) of the pixel rows 122, the visual Moiré issue caused by the second electrode 172 and the array of the pixel units 124 (i.e. the pixel array) can be avoided, and the second electrode 172 becomes an invisible structure. In this way, a visual quality and a display quality of the sensing display device 100 can be greatly increased.

Figure 2:
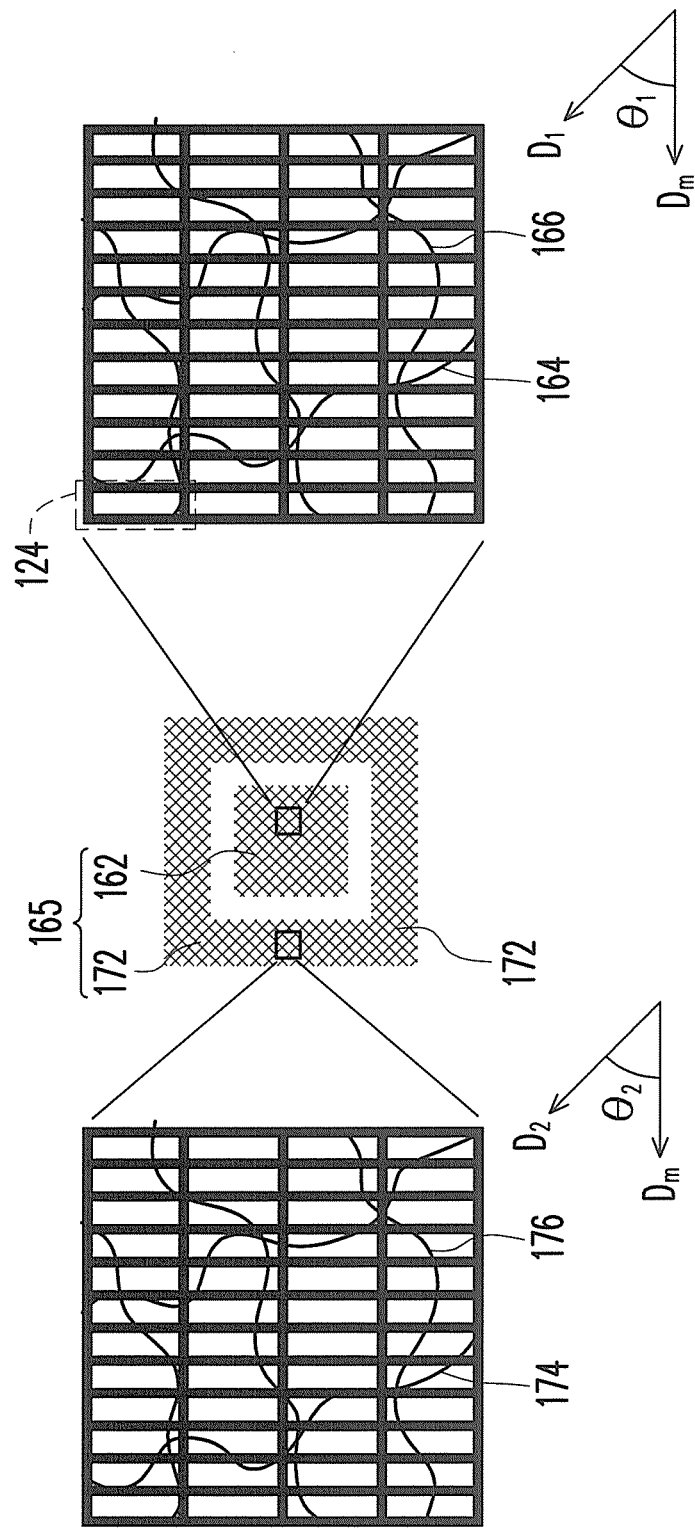
FIG. 2 is a partial schematic diagram illustrating a configuration showing the relationship of a first electrode, a second electrode and pixel units according to another embodiment of the invention.

It should be noticed that in the present embodiment, although the first traces 164 and the second traces 166 used for forming the first electrode 162 are substantially straight lines, in another embodiment shown in FIG. 2, the first traces 164 and the second traces 166 can also be curves, wherein the first traces 164 are substantially extended along a first direction D1, the first direction D1 is a tangent direction, a first angle θ1 is formed between the first direction D1 and the primary direction $D_m$, and the first angle θ1 is an acute angle. The second traces 166 are substantially intersected to the first traces 164. In this way, the visual Moiré issue caused by the first electrode 162 and the array of the pixel units 124 (i.e. the pixel array) can also be avoided, and the first electrode 162 becomes an invisible structure. Similarly, the third traces 174 and the fourth traces 176 of the second electrode 172 can also be curves, wherein the third traces 174 are substantially extended along a second direction D2, wherein the second direction D2 is a tangent direction, a second angle θ2 is formed between the second direction D2 and the primary direction $D_m$, and the second angle θ2 is an acute angle. The fourth traces 176 are substantially intersected to the third traces 174. In this way, the visual Moiré issue caused by the second electrode 172 and the array of the pixel units 124 (i.e. the pixel array) can also be avoided, and the second electrode 172 becomes an invisible structure. Therefore, the sensing display device having the first electrodes 162 and the second electrodes 172 shown in FIG. 2 may have a good visual quality and a good display quality.

In the above embodiment, the electrodes 162 and 172 of the sensing element 150 of the sensing display device 100 are mesh-pattern structures formed by traces 164, 166, 174 and 176, so that the electrodes 162 and 172 may have good transmittance, relatively small resistance and good sensitivity. For example, a sheet resistance of the electrodes 162 and 172 is, for example, smaller than 5Ω/□, and the transmittance of the sensing element 150 is, for example, greater than 90%. Moreover, since specific acute angles (i.e. the first angle θ1 and the second angle θ2) are formed between the tangent directions of the traces 164 and 174 of the electrodes 162 and 172 and the arranging direction (i.e. the primary direction $D_m$) of the pixel rows 122, the visual Moiré issue caused by the electrodes 162 and 172 and the array of the pixel units 124 (i.e. the pixel array) can be avoided, and the electrode 162 and 172 may become invisible structures. Therefore, the sensing display device of the present embodiment has a good visual quality and display quality, and has a good sensing sensitivity in operation.

It should be noticed that in the first embodiment, the first electrodes 162 and the second electrodes 172 shown in FIG. 1C are taken as an example, though in other embodiments, the first electrodes 162 and the second electrodes 172 may have different shapes, and other structures can be disposed between the first electrodes 162 and the second electrodes 172.

Second Embodiment

Figure 3A:
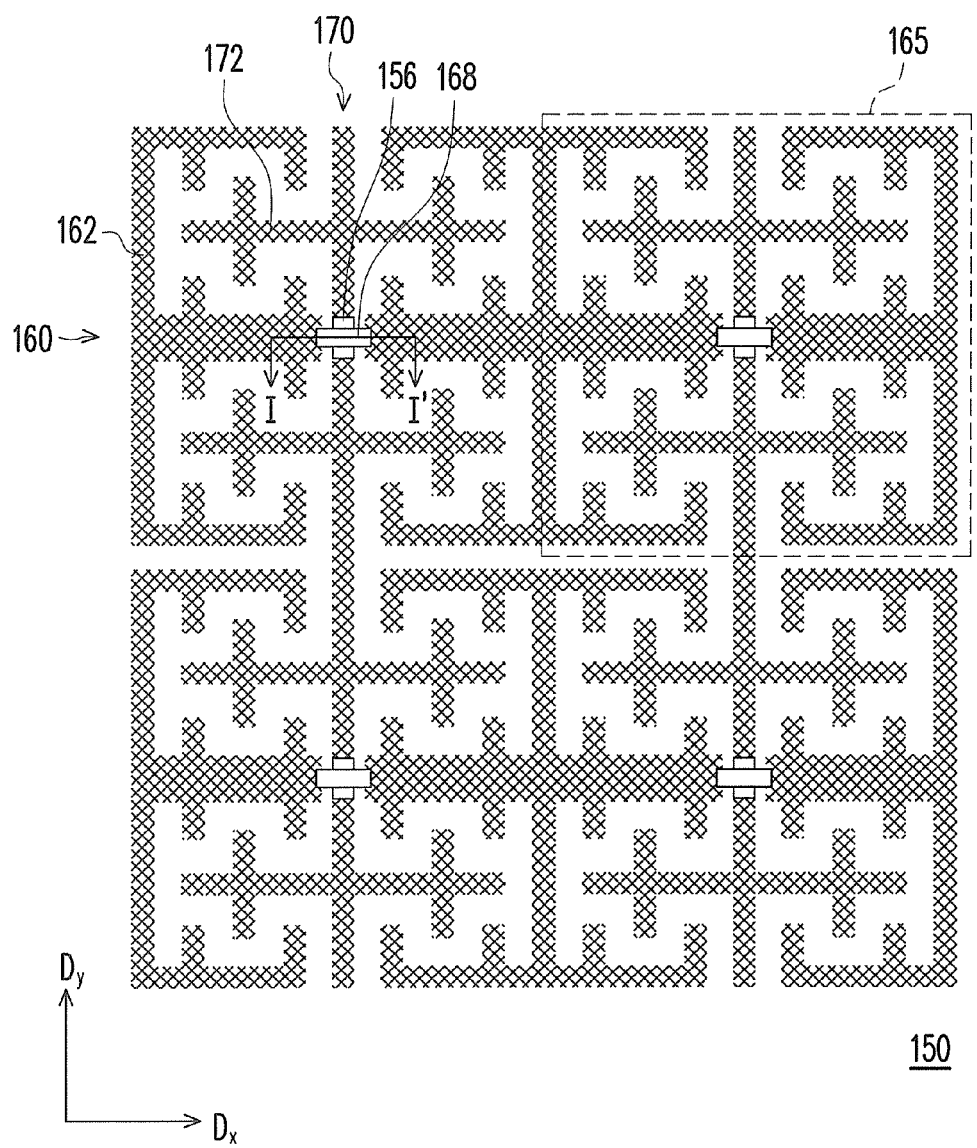
FIG. 3A is a top view of a sensing element of a sensing display device according to a second embodiment of the invention.
Figure 3B:
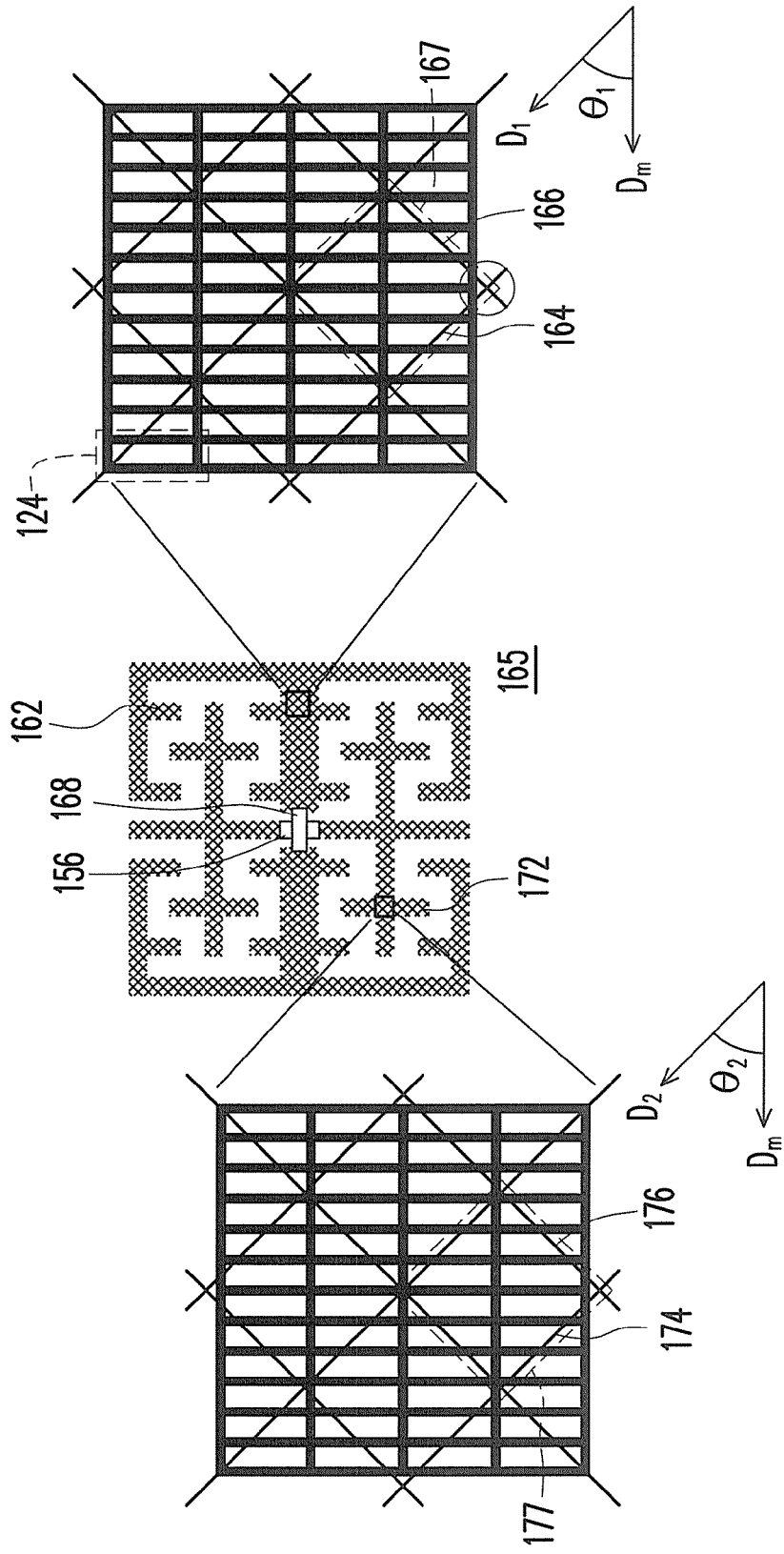
FIG. 3B is a partial schematic diagram illustrating a configuration showing the relationship of a first electrode and a second electrode of FIG. 3A and pixel units.
Figure 3C:
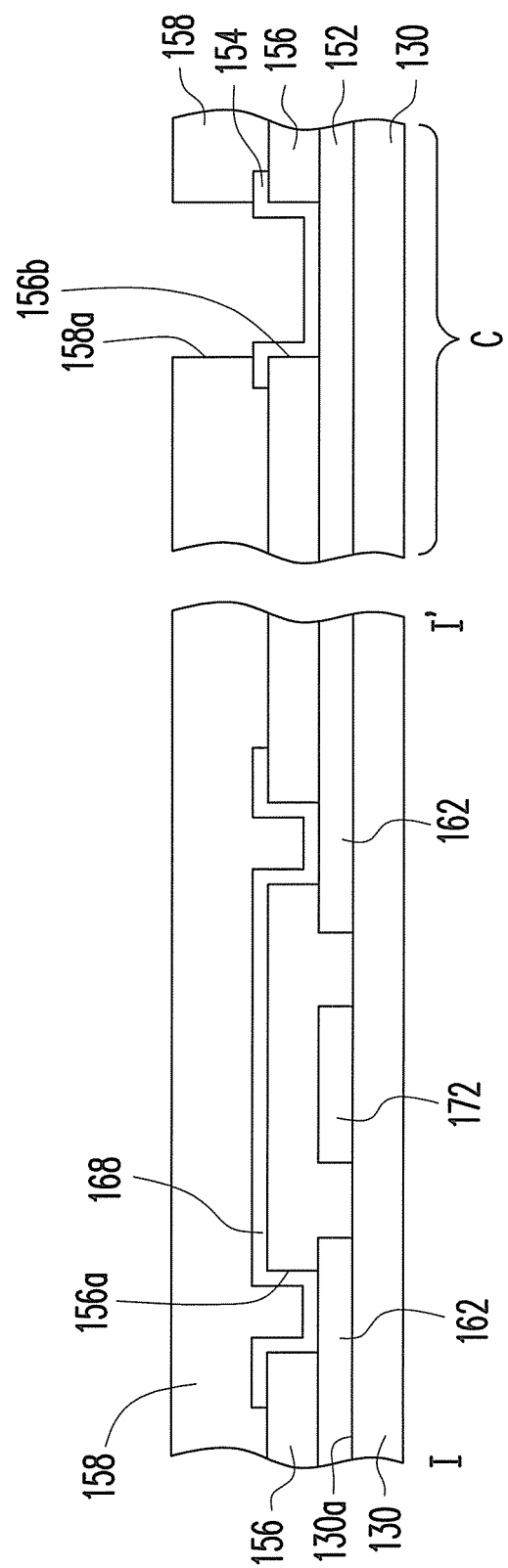
FIG. 3C is a partial cross-sectional view of FIG. 3A along I-I' line and a pin junction area.

FIG. 3A is a top view of a sensing element of a sensing display device according to a second embodiment of the invention, FIG. 3B is a partial schematic diagram illustrating a configuration showing the relationship of a first electrode and a second electrode of FIG. 3A and pixel units, and FIG. 3C is a partial cross-sectional view of FIG. 3A along an I-I' line and a pin junction area. Referring to FIG. 1B and FIG. 3A, the sensing element 150 is located on the array of the pixel units 124, and the sensing element 150 includes a plurality of sensor units 165. The sensor unit 165 is a mesh-pattern electrode. In the present embodiment, the sensor unit 165 includes a first electrode 162 and a second electrode 172. In detail, in the present embodiment, the sensing element 150 includes a plurality of the sensor units 165, which are arranged in a plurality of first serials 160 and a plurality of second serials 170. In the present embodiment, the first serial 160 is, for example, extended along a first axial direction $D_x$, and the first serial 160 includes a plurality of first electrodes 160 and a plurality of bridge lines 168 connected to the first electrodes 162. The second serial 170 is, for example, extended along a second axial direction $D_y$, and the second serial 170 includes a plurality of second electrodes 172 electrically connected to each other.

Referring to FIG. 3A and FIG. 3B, in the present embodiment, the first electrode 162 encircles the second electrode 172. The first electrode 162 includes a plurality of first traces 164 and a plurality of second traces 166. The first traces 164 are substantially extended along a first direction D1, and a first angle θ1 is formed between the first direction D1 and the primary direction $D_m$, and the first angle θ1 is an acute angle. The second traces 166 are substantially intersected to the first traces 164, and the second traces 166 are, for example, not parallel to the primary direction $D_m$, wherein the primary direction $D_m$ is the extending direction of the pixel rows 122 (referring to the related description of the first embodiment).

The second electrode 172 includes a plurality of third traces 174 and a plurality of fourth traces 176. The third traces 174 are substantially extended along a second direction D2, a second angle θ2 is formed between the second direction D2 and the primary direction $D_m$, and the second angle θ2 is an acute angle. The fourth traces 176 are substantially intersected to the third traces 174. The first angle θ1 and the second angle θ2 are about 20-70 degrees, or about 30-60 degrees. The third traces 174 are, for example, parallel to the first traces 164, and the fourth traces 176 are, for example, parallel to the second traces 166. In other words, in the present embodiment, the first electrode 162 and the second electrode 172 are substantially formed by two sets of traces having the same extending directions. Certainly, in other embodiments, the first electrode 162 and the second electrode 172 can also be formed by two sets of traces having different extending directions. Moreover, in other embodiments, one of the first electrode 162 and the second electrode 172 can be formed by a patterned conductive layer and does not have the mesh-pattern structure. Parameters such as the material, the line width and the spaces of the traces 164, 166, 174 and 176 are the same as that described in the first embodiment, and therefore detailed descriptions thereof are not repeated. It should be noticed that although a situation that all of the first traces 164 are extended along the first direction D1 is taken as an example, the first traces 164 may have different extending directions, though at least one of the first traces 164 is extended along the first direction D1.

Figure 4:
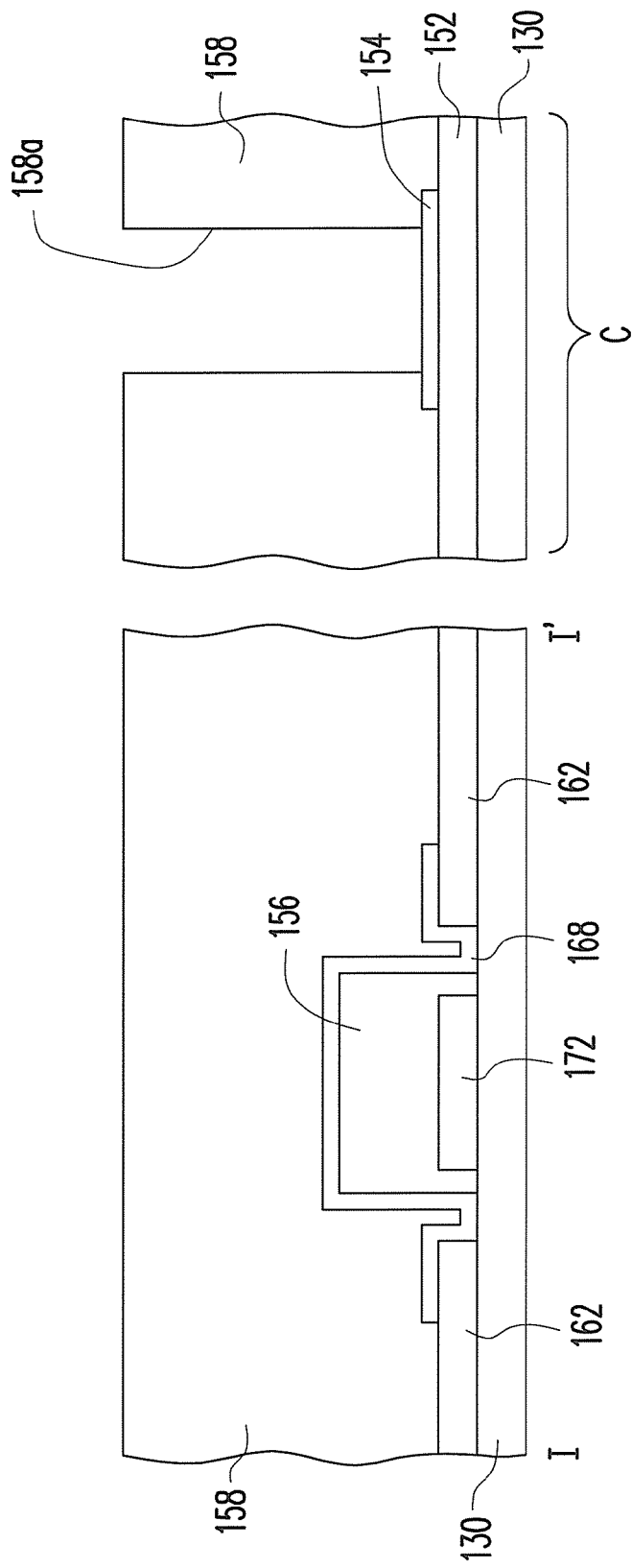
FIG. 4 is a partial cross-sectional view of FIG. 3B along I-I' line and a pin junction area according to another configuration.

Referring to FIG. 3B and FIG. 3C, the sensing element 150 further includes a dielectric layer 156 and a passivation layer 158. The dielectric layer 156 covers the first electrode 162 and the second electrode 172, the bridge line 168 is disposed on the dielectric layer 156, and is connected to the first electrode 162 through an opening 156a of the dielectric layer 156. In other words, the dielectric layer 156 is disposed between the bridge line 168 and the second electrode 172, so that the first serial 160 and the second serial 170 are mutually isolated. The passivation layer 158 covers the first serial 160, the second serial 170 and the dielectric layer 156. Moreover, in a pin junction area C which is electrically connected to ends of the first serial 160 and the second serial 170, the dielectric layer 156 covers a pin 152, and a patterned conductive layer 154 is disposed on the dielectric layer 156, and is electrically connected to the pin 152 through an opening 156b of the dielectric layer 156. The passivation layer 158 covers the dielectric layer 156, and has an opening 158a exposing the patterned conductive layer 154. Materials of the bridge line 168 and the patterned conductive layer 154 are, for example, transparent conductive metal oxides. Moreover, in another embodiment as that shown in FIG. 4, the dielectric layer 156 may only cover the second electrode 172, and the bridge line 168 is disposed on the dielectric layer 156 and is connected to the first electrode 162. The passivation layer 158 covers the bridge line 168, the dielectric layer 156, the first electrode 162 and the second electrode 172. In the pin junction area C, the patterned conductive layer 154 is disposed on the pin 152 and is electrically connected to the pin 152. The passivation layer 158 covers the patterned conductive layer 154 and the pin 152, and has the opening 158a exposing the patterned conductive layer 154.

In the present embodiment, by forming a first angle θ1 between the first traces 164 of the first electrode 162 and the arranging direction (the primary direction $D_m$) of the pixel rows 122, and by forming a second angle θ2 between the third traces 174 of the second electrode 172 and the arranging direction (the primary direction $D_m$) of the pixel rows 122, the visual Moiré issue caused by the first electrode 162 and the second electrode 172 and the array of the pixel units 124 (i.e. the pixel array) can be avoided. In this way, the sensing display device having the sensing element 150 may have a good visual quality and display quality, and has a good sensing sensitivity in operation.

Third Embodiment

Figure 5A:
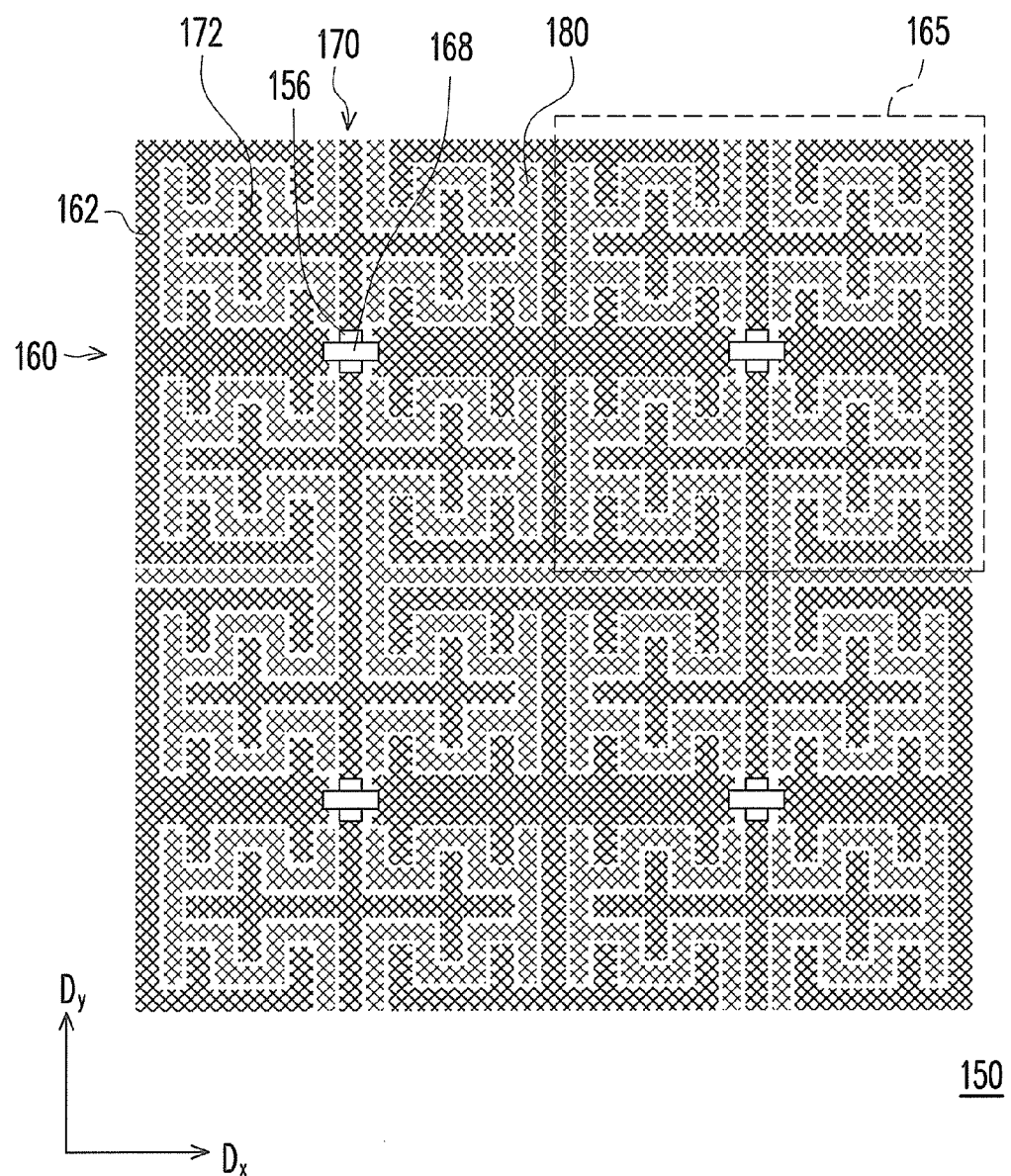
FIG. 5A is a top view of a sensing element of a sensing display device according to a third embodiment of the invention.
Figure 5B:
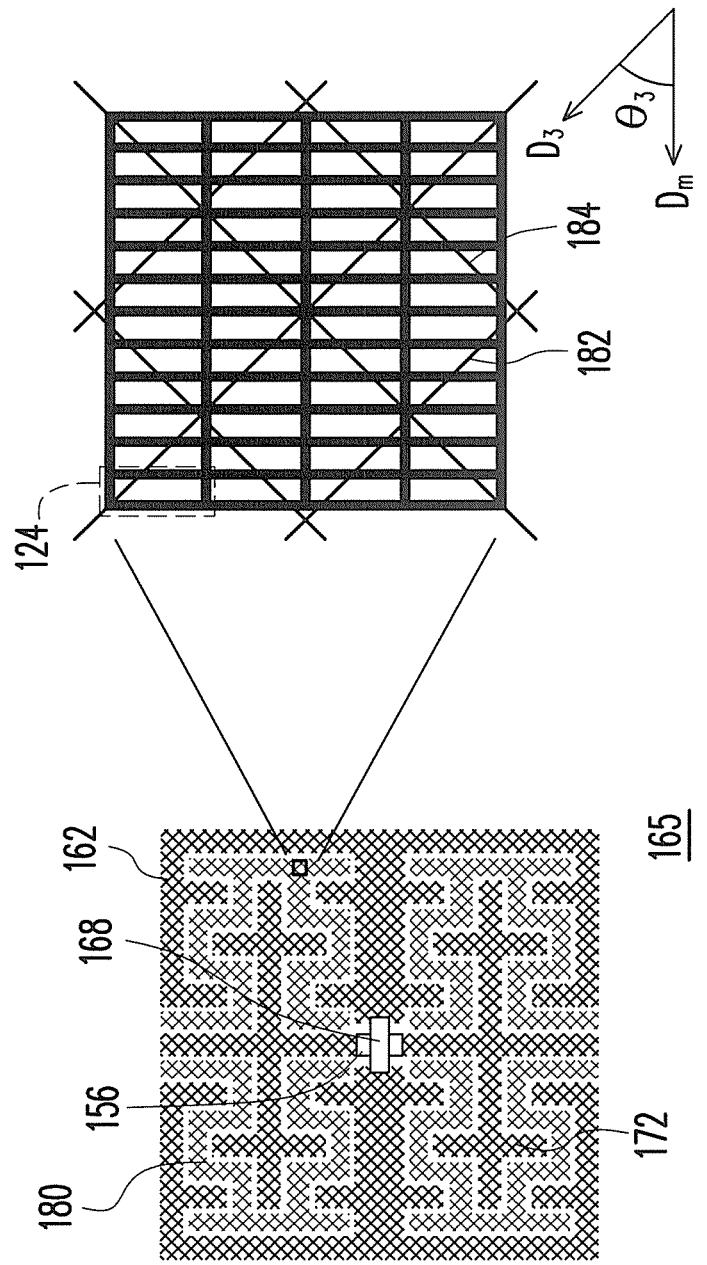
FIG. 5B is a partial enlarged diagram of FIG. 5A and a partial schematic diagram illustrating a configuration showing the relationship of dummy electrodes and pixel units.

FIG. 5A is a top view of a sensing element of a sensing display device according to a third embodiment of the invention, FIG. 5B is a partial enlarged diagram of FIG. 5A and a partial schematic diagram illustrating a configuration showing the relationship of dummy electrodes and a pixel unit array. A structure of the sensing element of the present embodiment is similar to that of the sensing element of FIG. 3A, and a main difference there between is that in the present embodiment, a plurality of dummy electrodes 180 is disposed between the first electrodes 162 and the second electrodes 172. The dummy electrodes 180 are described below.

Referring to FIG. 5A and FIG. 5B, in the present embodiment, the dummy electrodes 180 are disposed between the first electrodes 162 and the second electrodes 172, and the dummy electrodes 180 are floated. The dummy electrode 180 is, for example, a mesh-pattern electrode formed by a plurality of fifth traces 182 and a plurality of sixth traces 184. The fifth traces 182 are substantially extended along a third direction D3, wherein a third angle θ3 is formed between the third direction D3 and the primary direction $D_m$, wherein the third angle θ3 is an acute angle. The third angle θ3 is about 20-70 degrees, or about 30-60 degrees. The sixth traces 184 are substantially intersected to the fifth traces 182. The third direction D3 is substantially parallel to the first direction D1. In other words, the fifth traces 182 are parallel to the first traces 164 of the first electrode 162 (shown in FIG. 3B). Moreover, the sixth traces 184 are parallel to the second traces 166 of the first electrode 162 (shown in FIG. 3B). Certainly, in other embodiments, the fifth traces 182 are not parallel to the first traces 164, and the sixth traces 184 are not parallel to the second traces 166. In other words, the dummy electrode 180, the first electrode 162 and the second electrode 172 can be formed by traces having different extending directions. In the present embodiment, a material of the fifth traces 182 and the sixth traces 184 includes metal or transparent conductive metal oxide, wherein the metal is, for example, aluminium, copper, molybdenum, titanium, silver, gold, platinum and alloy thereof, and the transparent conductive metal oxide is, for example, an indium tin oxide (ITO), an indium zinc oxide (IZO) or other metal oxides. A line width of the fifth traces 182 and the sixth traces 184 is, for example, between 0.1 μm-100 μm. Therefore, the dummy electrode 180 is substantially formed by extremely fine metal wires, so that the dummy electrode 180 has a high transmittance. It should be noticed that in the present embodiment, although the dummy electrode 180 is the mesh-pattern electrode formed by the traces 182 and 184, in other embodiments, the dummy electrode 180 can also be formed by a patterned conductive layer and does not have the mesh-pattern structure.

In the present embodiment, the dummy electrode 180 is disposed between the first electrode 162 and the second electrode 172, and the dummy electrode 180 can fill up interspace between the first electrode 162 and the second electrode 172, so that the first electrode 162 and the second electrode 172 become invisible structures. Moreover, by forming a third angle θ3 between the fifth traces 182 of the dummy electrode 180 and the arranging direction (the primary direction $D_m$) of the pixel rows 122, the visual Moiré issue caused by the mesh-pattern dummy electrode 180 and the array of the pixel units 124 (i.e. the pixel array) can be avoided. In this way, the sensing display device having the sensing element 150 may have a good visual quality and display quality, and have a good sensing sensitivity in operation.

Fourth Embodiment

Figure 6A:
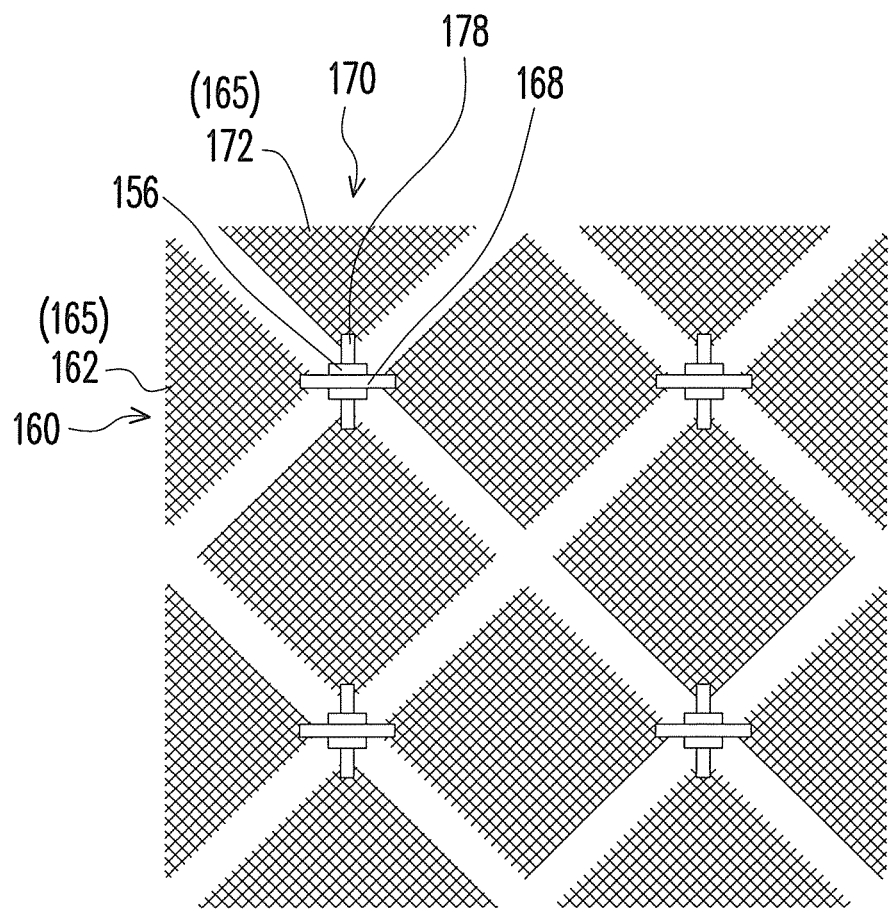
FIG. 6A is a top view of a sensing element of a sensing display device according to a fourth embodiment of the invention.
Figure 6A:
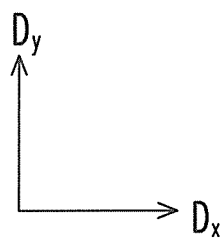
Figure 6B:
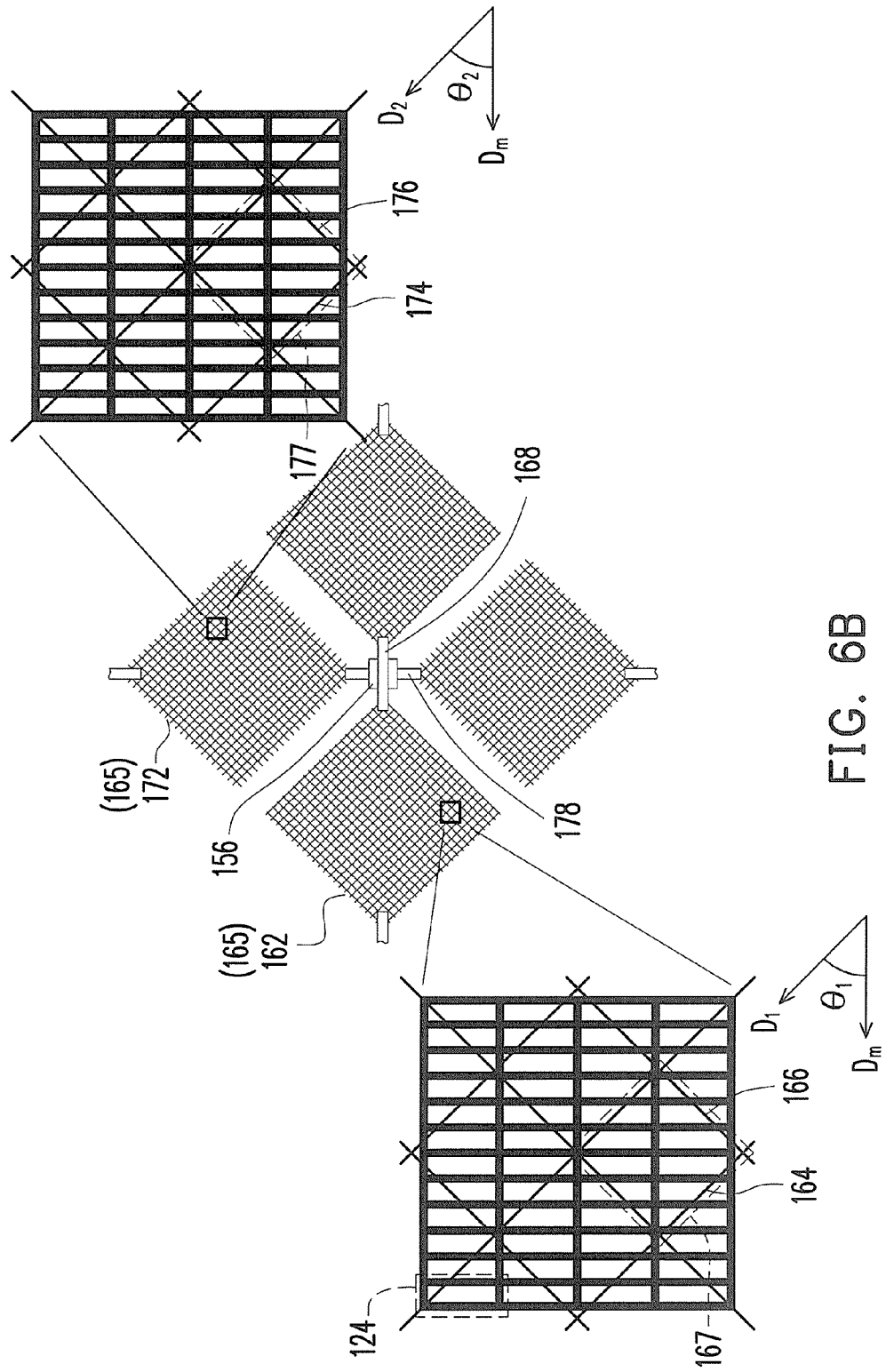
FIG. 6B is a partial schematic diagram illustrating a configuration showing the relationship of a first electrode and a second electrode of FIG. 6A and pixel units.

FIG. 6A is a top view of a sensing element of a sensing display device according to a fourth embodiment of the invention, FIG. 6B is a partial schematic diagram illustrating a configuration showing the relationship of a first electrode and a second electrode of FIG. 6A and a pixel unit array. Referring to FIG. 1A and FIG. 6A, the sensing element 150 is disposed on the pixel units 124, and the sensing element 150 includes a plurality of sensor units, wherein the sensor unit is a mesh-pattern electrode. In the present embodiment, the sensor unit is, for example, the first electrode 162 or the second electrode 172. In detail, in the present embodiment, the sensing element 150 includes a plurality of sensor units 165, which are arranged in a plurality of first serials 160 and a plurality of second serials 170. The first serial 160 is, for example, extended along a first axial direction $D_x$, and the first serial 160 includes a plurality of first electrodes 160 and a plurality of bridge lines 168 connected to the first electrodes 162. The second serial 170 is, for example, extended along a second axial direction $D_y$, and the second serial 170 includes a plurality of second electrodes 172 and a plurality of bridge lines 178 connected to the second electrodes 172. The first serials 160 are electrically isolated with one another. The second serials 170 are electrically isolated with one another. A dielectric layer 156 is further disposed at a junction of the first serial 160 and the second serial 170, so that the first serial 160 and the second serial 170 are mutually isolated.

Referring to FIG. 6A and FIG. 6B, in the present embodiment, the first electrode 162 and the second electrode 172 are, for example, the sensor units 165. The first electrode 162 includes a plurality of first traces 164 and a plurality of second traces 166. The first traces 164 are substantially extended along a first direction D1, a first angle θ1 is formed between the first direction D1 and the primary direction $D_m$, wherein the first angle θ1 is an acute angle. The second traces 166 are substantially intersected to the first traces 164, and the second traces 166 are, for example, not parallel to the primary direction $D_m$, wherein the primary direction $D_m$ is the extending direction of the pixel rows 122 (referring to the related description of the first embodiment). The second electrode 172 includes a plurality of third traces 174 and a plurality of fourth traces 176. The third traces 174 are substantially extended along a second direction D2, a second angle θ2 is formed between the second direction D2 and the primary direction $D_m$, wherein the second angle θ2 is an acute angle. The fourth traces 176 are substantially intersected to the third traces 174. The third traces 174 are, for example, parallel to the first traces 164, and the fourth traces 176 are, for example, parallel to the second traces 166. The first angle θ1 and the second angle θ2 are about 20-70 degrees, or about 30-60 degrees. Certainly, in other embodiments, the third traces 174 are probably not parallel to the first traces 164, and the fourth traces 176 are probably not parallel to the second traces 166. Moreover, in the present embodiment, although a situation that the first electrode 162 and the second electrode 172 are rectangular sensor units 165 is taken as an example, in other embodiments, the first electrode 162 and the second electrodes 172 may also have other shapes. Moreover, parameters such as the material, the line width and the spaces of the traces 164, 166, 174 and 176 are the same as that described in the first embodiment, and therefore detailed descriptions thereof are not repeated. It should be noticed that in the present embodiment, the bridge lines 168 and 178 are, for example, formed by a patterned conductive layer, and do not have the mesh-pattern structure, and materials of the bridge lines 168 and 178 are, for example, transparent conductive metal oxides. However, in other embodiments, the bridge lines 168 and 178 can also be mesh-pattern wires formed by traces. For example, the bridge line 178 may include a plurality of the third traces 174 and a plurality of the fourth traces 176, so as to form integrally with the second electrode 172.

In the present embodiment, by forming a first angle $\theta 1$ between the first traces 164 of the first electrode 162 and the arranging direction (the primary direction $D_m$) of the pixel rows 122, and by forming a second angle $\theta 2$ between the third traces 174 of the second electrode 172 and the arranging direction (the primary direction $D_m$) of the pixel rows 122, the visual Moiré issue caused by the first electrode 162 and the array of the pixel units 124 (i.e. the pixel array) and caused by the second electrode 172 and the array of the pixel units 124 (i.e. the pixel array) can be avoided. In this way, the sensing display device having the sensing element 150 may have a good visual quality and display quality, and have a good sensing sensitivity in operation.

Figure 7A:
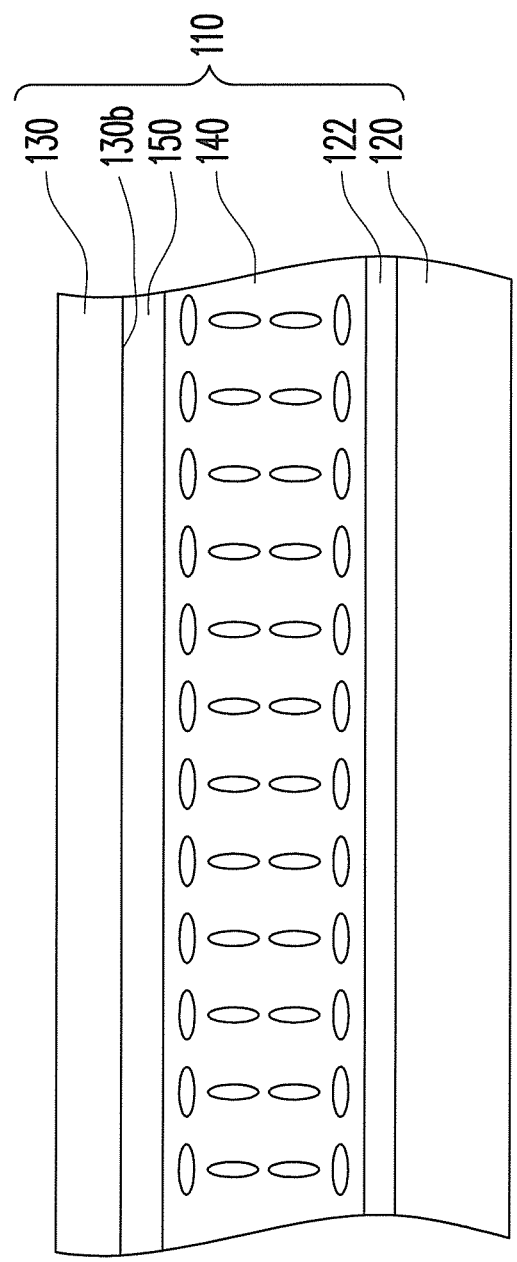
FIG. 7A is a cross-sectional view of a sensing display device according to an embodiment of the invention.
Figure 7B:
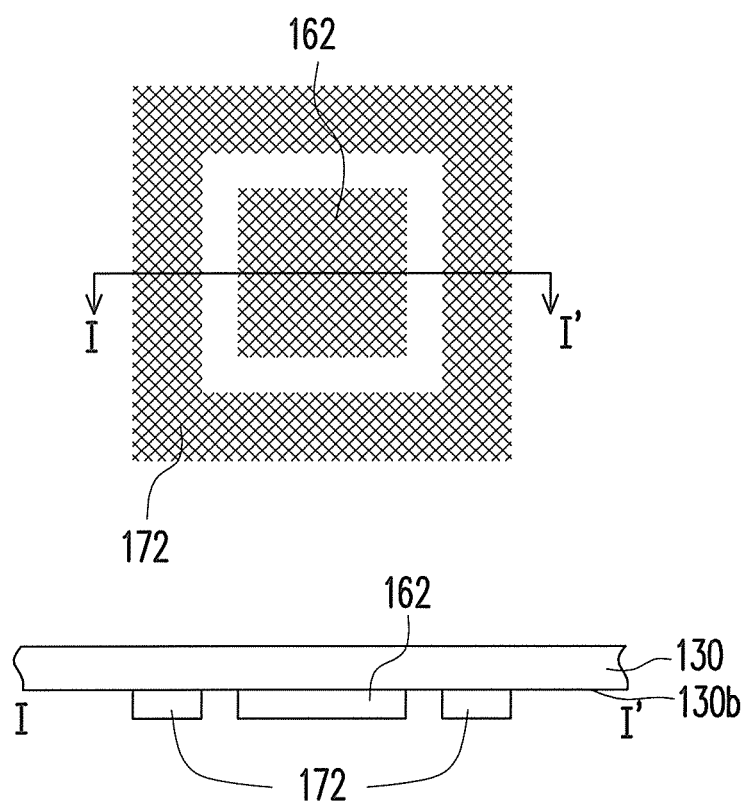
FIG. 7B is a top view of a first electrode and a second electrode of a sensing element of FIG. 1D and FIG. 2 and a cross-sectional view thereof along I-I' line.

It should be noticed that in the above embodiments, as that shown in FIG. 1A, the sensing element 150 is formed on the outer surface 130*a* of the opposite substrate 130. Though in another embodiment, as that shown in FIG. 7A and FIG. 7B, in the sensing display device 100*a*, the sensing element 150 can also be built in the display panel 110, i.e. the sensing element 150 is formed on an inner surface 130*b* of the opposite substrate 130, so that the sensing element 150 is located between the opposite substrate 130 and the display medium layer 140. The first electrodes 162 and the second electrodes 172 are all formed on the inner surface 130*b* of the opposite substrate 130, i.e. the first serial 160 and the second serial 170 are all foamed on the inner surface 130*b* of the opposite substrate 130.

Figure 8:
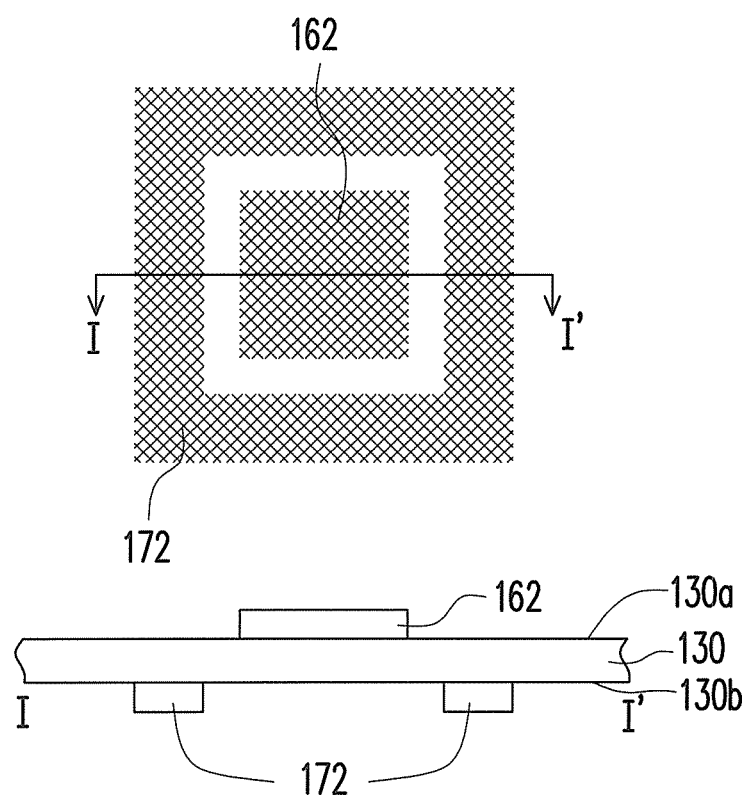
FIG. 8 is a top view of a first electrode and a second electrode of a sensing element of a sensing display device according to another embodiment of FIG. 1D and FIG. 2 and a cross-sectional view thereof along I-I' line.
Figure 9:
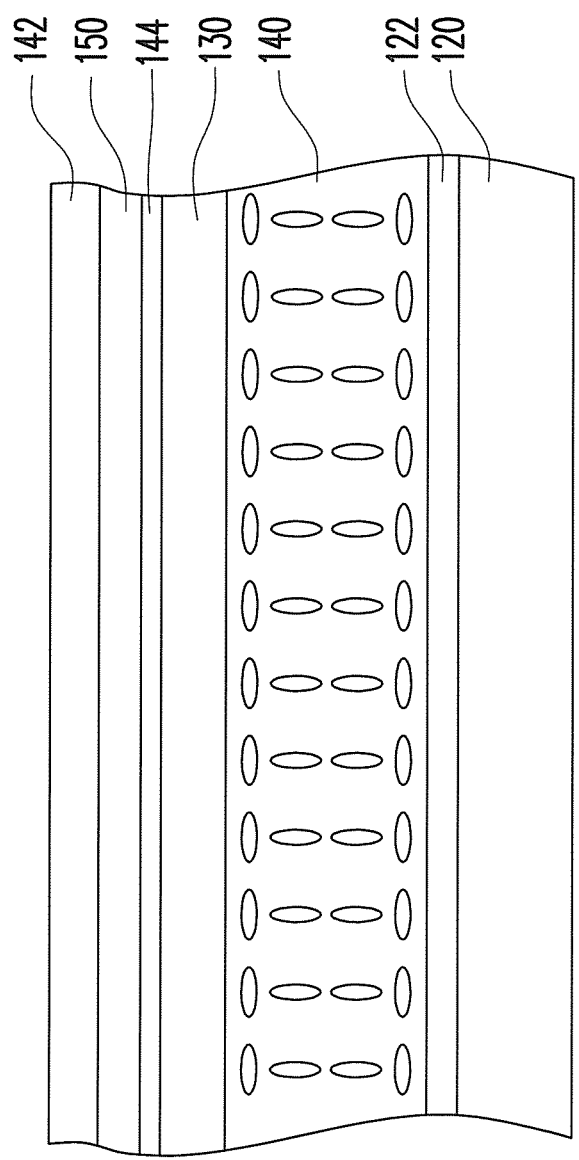
FIG. 9 is a cross-sectional view of a sensing display device according to an embodiment of the invention.

In still another embodiment, the first serial 160 and the second serial 170 can be disposed on different surfaces of the opposite substrate 130. For example, as shown in FIG. 8, the first electrodes 162 and the second electrodes 172 can be respectively disposed on the outer surface 130*a* and the inner surface 130*b* of the opposite substrate 130, wherein the outer surface 130*a* and the inner surface 130*b* are located at two opposite sides of the opposite substrate 130. Alternatively, the first electrodes 162 and the second electrodes 172 can be respectively disposed on the inner surface 130*b* and the outer surface 130*a* of the opposite substrate 130 (not shown). Moreover, as shown in FIG. 9, in the sensing display device 100*b*, the sensing element 150 can be fabricated on a substrate 142, and then the substrate 142 formed with the sensing element 150 can be directly disposed on the outer surface of the display panel 110, or attached to the outer surface of the display panel 110 through an adhesive layer 144, so as to form an external-attached sensing display device 100*b*, wherein the first serial 160 and the second serial 170 can be formed on a same surface (not shown) of the substrate 142, or formed on opposite surfaces (not shown) of the substrate 142. In other words, the sensing element 150 can be bonded to or formed in the display panel 110 through various methods.

It should be noticed that in the aforementioned embodiments, although the sensing element 150 having the first electrodes 160 and the second electrodes 172 shown in FIG. 1C, FIG. 3A or FIG. 6A is taken as an example, the invention is not limited thereto. In other words, in other embodiments, the first traces and the second traces can also be used to form any other electrode structure known by those skilled in the art. Moreover, in the aforementioned embodiments, although the mesh-pattern electrode is formed by the first traces and the second traces, or formed by the third traces and the fourth traces, in other embodiments, the mesh-pattern electrode is probably only formed by the first traces.

In summary, the sensing element of the sensing display device of the invention has electrodes formed by a plurality of intersected traces, wherein an acute angle is formed between the traces and the arranging direction of the pixel units. In this way, the visual Moiré issue caused by the mesh-pattern electrodes formed by the intersected traces and the pixel units arranged in an array can be avoided, so that a visual quality and a display quality of the sensing display device are improved. Moreover, since the traces are extremely fine metal wires, the mesh-pattern electrodes formed by the traces may have relatively low resistance and relatively high transmittance, so that a sensing sensitivity and a display quality of the mesh-pattern electrodes are improved. In addition, dummy electrodes can be disposed between the mesh-pattern electrodes, so that the mesh-pattern electrodes may become invisible structures. In other words, the sensing display device of the invention has a good visual quality and display quality, and has a good sensing sensitivity in operation.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A sensing display device, comprising:
a display panel, comprising;
  an array substrate;
  an opposite substrate having an outer surface; and
  a plurality of pixel units located on the array substrate, wherein the pixel units are arranged along a primary direction; and
a sensing element, formed on the outer surface of the opposite substrate, the sensing element comprising:
  a plurality of first serials, wherein each of the first serials comprises:
    a plurality of first electrodes, each of the first electrodes comprising:
      a plurality of first traces substantially extended along a first direction, wherein a first angle is formed between the first direction and the primary direction, the first angle is an acute angle, a line width of one of the first traces is 0.1 μm to 100 μm, and a material of one of the first traces comprises aluminum, copper, molybdenum, titanium, silver, gold, platinum or alloy thereof; and
      a plurality of second traces perpendicular to the first traces to form a plurality of grids arranged in periodicity; and
    a plurality of bridge lines connected to the first electrodes, wherein one of the bridge lines is connected between two adjacent first electrodes;
  a plurality of second serials, wherein each of the second serials comprises a plurality of second electrodes, each of the second electrodes comprising:
    a plurality of third traces substantially extended along a second direction, wherein a second angle is formed between the second direction and the primary direction, the second angle is an acute angle, a line width of each of the third traces is 0.1 μm to 100 μm, and a material of each of the third traces comprises aluminum, copper, molybdenum, titanium, silver, gold, platinum or alloy thereof; and
a plurality of fourth traces perpendicular to the third traces to form a plurality of grids arranged in periodicity, wherein a sensor unit is constituted by one of the first electrodes and one of the second electrodes;
a passivation layer covering the first serials and the second serials; and
a plurality of dummy electrodes disposed between the first electrodes and the second electrodes, wherein each of the dummy electrodes are floated and comprises:
a plurality of fifth traces, substantially extended along a third direction, wherein a third angle is formed between the third direction and the primary direction, and the third angle is an acute angle; and
a plurality of sixth traces, perpendicular to the fifth traces, wherein the first, second, third, fourth, fifth and sixth traces are straight lines.

2. The sensing display device as claimed in claim 1, wherein the first angle is about 20 -70 degrees.

3. The sensing display device as claimed in claim 1, wherein the first angle is about 30 -60 degrees.

4. The sensing display device as claimed in claim 1, wherein the third direction is substantially parallel to the first direction.

5. The sensing display device as claimed in claim 1, wherein one of the first electrode and the second electrode is an outer electrode, and another one of the first electrode and the second electrode is an inner electrode.

6. The sensing display device as claimed in claim 5, wherein the third direction is substantially parallel to the first direction.

7. The sensing display device as claimed in claim 1, wherein the display panel further comprises:
a display medium layer, located between the array substrate and the opposite substrate.

8. The sensing display device as claimed in claim 1, wherein the sensing element further comprises a dielectric layer located between the first electrodes and the second electrodes.

9. The sensing display device as claimed in claim 1, wherein the first serials and the second serials are electrically isolated.

10. The sensing display device as claimed in claim 1, wherein a transmittance of the sensing element is greater than 90 %.

11. The sensing display device as claimed in claim 5, wherein the inner electrode is surrounded by the outer electrode.

12. The sensing display device as claimed in claim 1, wherein the sensing element further comprises a dielectric layer covering the first electrodes and the second electrodes, and wherein the bridge lines are located on the dielectric layer.

13. The sensing display device as claimed in claim 1, wherein the sensing element further comprises:
a pin electrically connected to an end of the first serial or the second serial; and
a patterned conductive layer located above and electrically connected to the pin, wherein the passivation layer has an opening to expose the patterned conductive layer.

14. The sensing display device as claimed in claim 1, wherein the bridge lines are formed integrally with the second electrodes and wherein each of the bridge lines comprises a plurality of traces.

15. The sensing display device as claimed in claim 1, wherein each of the bridge lines is a wire formed by a patterned conductive layer and does not have a mesh-pattern structure, and wherein a material of each of the bridge line is transparent conductive metal oxide.

* * * * *